US006658142B1

(12) United States Patent
Kam et al.

(10) Patent No.: US 6,658,142 B1
(45) Date of Patent: Dec. 2, 2003

(54) COMPUTERIZED ADAPTIVE IMAGING

(75) Inventors: Zvi Kam, Tel Aviv (IL); John W. Sedat, San Francisco, CA (US); David A. Agard, San Francisco, CA (US); Bridget M. Hanser, San Francisco, CA (US)

(73) Assignees: Yeda Research and Development Co., Ltd., Rehovot (IL); The Regents of the University of California, Oakland, CA (US)

( * ) Notice: Subject to any disclaimer, the term of this patent is extended or adjusted under 35 U.S.C. 154(b) by 0 days.

(21) Appl. No.: 09/238,225

(22) Filed: Jan. 27, 1999

(51) Int. Cl.[7] ................................................. G06K 9/00
(52) U.S. Cl. ....................................... 382/130; 345/419
(58) Field of Search ................................ 382/130, 128; 514/356; 250/548, 201.9; 345/419

(56) References Cited

U.S. PATENT DOCUMENTS

| 5,283,777 | A | * | 2/1994 | Tanno et al. ................. 369/108 |
| 5,671,136 | A | | 9/1997 | Willhoit, Jr. |
| 5,694,249 | A | * | 12/1997 | Misawa ........................ 359/620 |
| 5,783,833 | A | * | 7/1998 | Sugaya et al. ............... 250/548 |
| 5,787,146 | A | | 7/1998 | Giebeler |
| 5,912,257 | A | * | 6/1999 | Prasad et al. ................ 514/356 |
| 6,084,227 | A | * | 7/2000 | Rhoads ........................ 250/201 |

FOREIGN PATENT DOCUMENTS

GB      2 321 968        8/1998

OTHER PUBLICATIONS

Scalettar, B.A. et al., "Dispersion, Aberration and Deconvolution in Multi–Wavelength Fluorescence Images", *Journal of Microscopy*, vol. 182, No. 1, Apr. 1996, pp. 50–60.
Patent Abstracts of Japan, vol. 1997, No. 08, Aug. 1997.
Agard, D. et al., "Three–Dimensional Microscopy: Image Processing for High Resolution Subcellular Imaging", *New Methods in Microscopy and Low Light Imaging*, USA, Aug. 1989, vol. 1161, pp. 24–30.
Pratt, W.K. "Digital Image Processing", NY John Wiley & Sons, Inc., (1991).
Rosenfeld, A and Kak, A.C. "Digital Picture Processing", Academic Press. (1976).
Castleman, K.R. "Digital Image procssing", Prentice–Hall inc., Englewood Cliffs, New Jersey. (1979).
Inoui, S. and Spring, K.S. "Video Microscopy: The Fundamentals", 2nd Edition, Plenum Press, NY (1997).
Tanford, C. "Physical Chemistry of Macromolecules", John Wiley NY. (1961).
Allen R.D. et al., "Video–Enhanced Contrast, Differential Interference Contrast (Avec–Dic), Microscopy: A New Method Capable of Analyzing Microtuble Related Motility in the Reticulopodial Network of Allogromia Laticollaria", Cell Motility 1:291–302 (1981).

(List continued on next page.)

*Primary Examiner*—Jayanti K. Patel
*Assistant Examiner*—Barry Choobin
(74) *Attorney, Agent, or Firm*—Darby & Darby

(57) ABSTRACT

Apparatus for computational adaptive imaging comprises the following:

an image information acquirer, which provides information relating to the refractive characteristics in a three-dimensional imaged volume;

a ray tracer, which uses the information relating to the refractive characteristics to trace a multiplicity of rays from a multiplicity of locations in the three-dimensional imaged volume through the three-dimensional imaged volume, thereby providing a location dependent point spread function; and a deconvolver, which uses the location dependent point spread function, to provide an output image corrected for distortions due to variations in the refractive characteristics in the three-dimensional imaged volume.

33 Claims, 8 Drawing Sheets

OTHER PUBLICATIONS

Cogswell, C.J. et al., "Confocal Differential Interference Contrast (DIC) Microscopy: Including a Theoretical Analysis of Conventional and Confocal DIC Imaging", J. Microsc. 165:81–101 (1992).

Gelles, J. et al., "Tracking Kinesin–Driven Movements with Nanometre–Scale Precision", Nature 331:450–453 (1988).

Hdusler, G. et al., "Imaging with Expanded Depth of Focus", Zeiss Inform. 29:9–13 (1987).

Preza, C. et al., "Image Reconstruction for Three–Dimensional Transmitted Light DIC Microscopy ", SPIE 2984:220–231 (1997).

Schormann, T. et al., "Contrast Enhancement and Depth Perception in Three–Dimensional Representations of Differential Interference Contrast and Confocal Scanning Laser Microscope Images", J.Microsc. 166:155–168 (1992).

Hecht E. et al., "Optics", 2nd Edition, Addison–Wesley Reading MA (1997).

Jenkins, F.A. et al., "Fundamentals of Optics", McGraw–Hill, NY (1950) CH.8: Ray Tracing.

Born M. et al., "Principles of Optics", Pergamon London (1959).

Goodman J.W. "Statistical Optics", John Wiley & Sons NY (1985).

Gibson S.F. et al., "Modeling Aberrations Due to Mismatched Layers for 3–D Microscopy" SPIE Optics in Complex Systems 1319:470–471 (1990).

Gibson S.F. et al., "Experimental Test of an Analytical Model of Abberations in an Oilimmersion Objective Lens Used in Three–Dimensional Light Microscopy", J. Opt. Soc. Am. A8:1601–1613 (1991).

Jansson , P.A. ed. "Deconvolution of Images and Spectra", Academic Press NY (1997).

Agard, D.A. et al., "Three–Dimensional Architecture of a Polytene Nucles", Nature 302:676–681 (1984).

Agard, D.A. et al., "Fluorescence Microscopy in Three Dimensions", Methods in Cell Biology 30:353–377 (1989).

Boden, A.F. et al., "Comparative Results with Massively Prallel Spatially Variant Maximum Likelihood Image Restoration", Bul Am Astr. Soc. 27:924–929 (1995).

Boden, A.F. et al., "Massively Parallel Spatially–Variant Maximum Likelihood Restoration of Hubble Space Telescope Imagery", J.Opt Soc Am A 13:1537–1545 (1996).

Tyson R.K. "Principles of Adaptive Optics", Academic Press NY (1991).

Carrington, W.A. et al., "Superresolution Three Dimensional Images of Fluorescence in Cells with Minimal Light Exposure", Science 268:1483–1487 (1995).

Femino, A.M. et al., " Visualization of Single RNA Transcripts in Situ", Science 280:585–590 (1998).

Z. Kam, "Microscopic Differential Interference Contrast Image Processing by Line Integration (LID) and Deconvolution", Bioimaging 6(4): 166–176 (1998).

Nomarski's DIC Microscopy: A Review, Institute of Applied Optics, SPIE 1846:10–25 (1995).

* cited by examiner

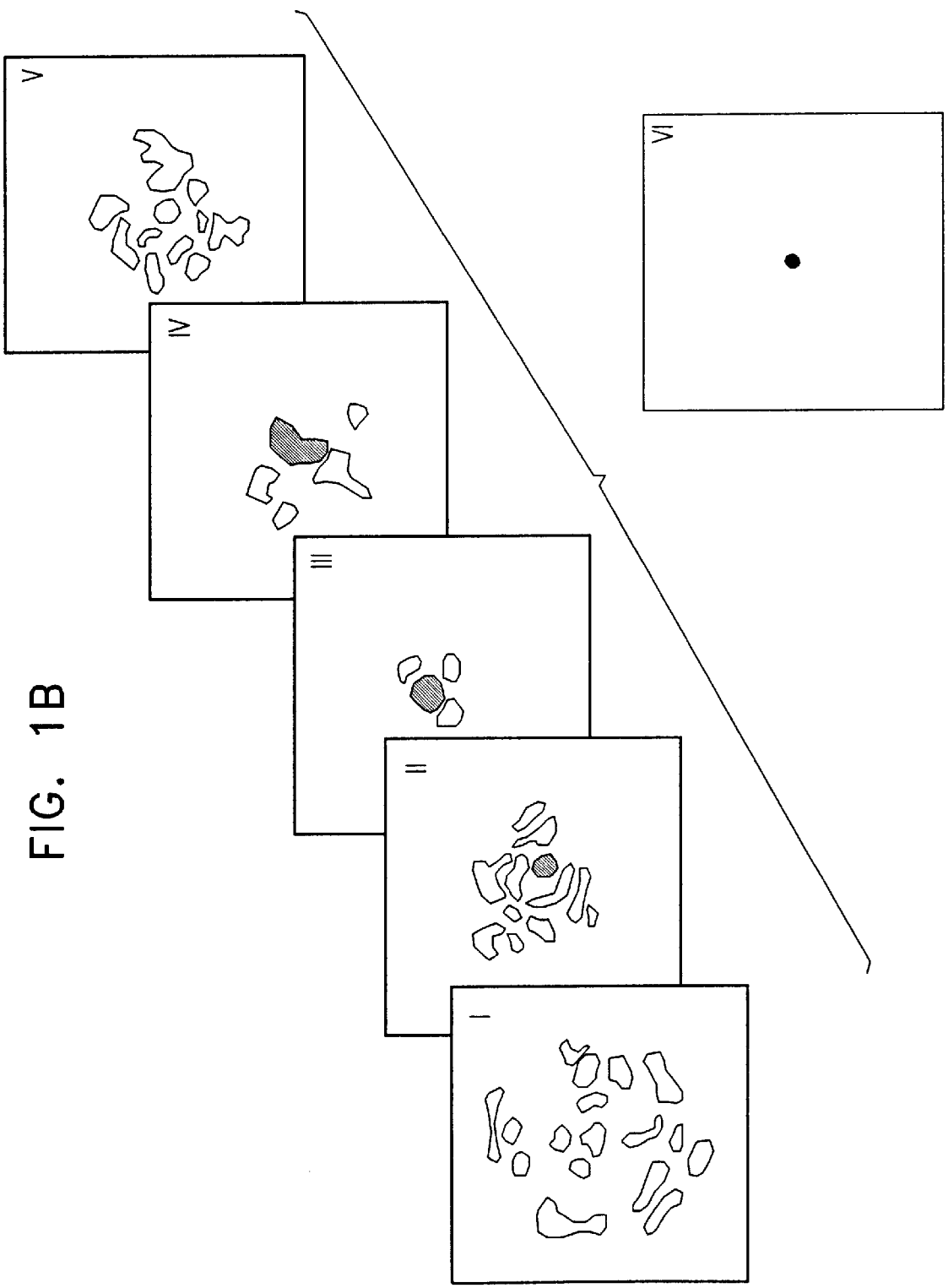

COMPUTERIZED ADAPTIVE IMAGING

FIELD OF THE INVENTION

The present invention relates to imaging generally and more particularly to post acquisition image processing generally.

BACKGROUND OF THE INVENTION

Post acquisition image processing is well known in the literature. Publications which describe the general state of the art in post acquisition image processing are: Lim, J. S. "Two dimensional signal and image processing". Englewood Cliffs, N.J. Prentice Hall. (1990); Russ, J. C. "Image processing handbook". CRC Press. (1992); Pratt, W. K. "Digital image processing". NY John Wiley & Sons, Inc. (1991); Rosenfeld, A. and Kak, A. C. "Digital picture processing". Academic Press. (1976); Castleman, K. R. "Digital Image Processing". Prentice-Hall Inc. Englewood Cliffs, N.J. (1979).

Imaging which provides information relating to refractive characteristics in a imaged volume is known for extremely limited applications. In microscopy, Smith, Nomarski and Differential Interference Contrast (DIC) imaging is known and is described in the following publications: Nomarski, G. "Microinterferometre differential a ondes polarisees". J. Phys. Radium 16:9S–11S (1955); Lang, W. "Differential-Interferenz-Miikroskopie". Carl-Zeiss, Oberkochen (1975); Inoui, S. and Spring, K. S. "Video Microscopy: the fundamentals". 2nd edition. Plenum Press, NY. (1997). Tanford, C. "Physical chemistry of macromolecules". John Wiley NY. (1961). Appendix C describes classical Rayleigh interference methods, Philpot and Svenson methods based on schlieren image, Lamm method of line displacement, and Gouy interference method all developed for determination of one dimensional refractive index variations.

Computer analysis of DIC imaging is not readily achieved. Known instances are described in the following publications: Allen, R. D., Allen, N. S. and Travis, J. L. "Video-enhanced contrast, differential interference contrast (AVEC-DIC) microscopy: a new method capable of analyzing microtubule related motility in the reticulopodial network of Allogromia laticollaria." Cell Motility 1: 291–302 (1981); Cogswell, C. J. and Sheppard, C. J. R. "Confocal differential interference contrast (DIC) microscopy: including a theoretical analysis of conventional and confocal DIC imaging". J. Microsc. 165:81–101 (1992); Gelles, J., Schnapp, B. J. and Sheetz, M. P. "Tracking kinesin-driven movements with nanometre-scale precision", Nature 331:450–453 (1988); Hdusler, G. and Kvrner, E. "Imaging with expanded depth of focus". Zeiss Inform. 29: 9–13 (1987); Preza, C., Snyder, D. L. and Conchello, J-A. "Image reconstruction for three-dimensional transmitted light DIC microscopy". SPIE 2984:220–231 (1997);.Schormann, T. and Jovin, T. M. "Contrast enhancement and depth perception in three-dimensional representations of differential interference contrast and confocal scanning laser microscope images". J. Microsc. 166:155–168 (1992).

Computerized ray tracing between discrete refractive and reflective surfaces is extremely well developed, but is not well known in the environment of non-homogeneous indices of refraction. This area is described in the following publications: Hecht E. and Zajac A. "Optics" 2nd ed. Addison-Wesley Reading MA (1997); Jenkins, F. A, and White, H. E. "Fundamentals of optics". McGraw-Hill, NY (1950) ch.8: Ray Tracing.

Calculation of point spread functions (PSF) is extremely well known as described in the following publication: Born M. and Wolf E. "Principles of Optics" Pergamon London (1959);Goodman J. W. "Statistical Optics" John Wiley & Sons NY (1985); Hecht E. and Zajac A. "Optics" 2nd ed. Addison-Wesley Reading MA. (1997); Gibson S. F. and Lanni F. "Diffraction by circular aperture as a model for three-dimensional optical microscopy". Opt. Soc. Am. A 6:1357–1367 (1989); Gibson S. F. and Lanni F. "Modeling aberrations due to mismatched layers for 3-D microscopy" SPIE optics in complex systems 1319:470–471 (1990); Gibson S. F. and Lanni F. "Experimental test of an analytical model of aberration in an oil-immersion objective lens used in three-dimensional light microscopy". J. Opt. Soc. Am. A 8:1601–1613 (1991).

Deconvolution of three dimensional microscopic images having location independent PSF is well known and is described in the following publications, some of them authored by some of the present inventors: Jansson, P. A. ed. "Deconvolution of images and spectra". Academic Press NY (1997); Agard, D. A. and Sedat, J. W. "Three-dimensional architecture of a polytene nucleus". Nature 302:676–681 (1984); Agard, D. A., Hiraoka, Y., Shaw, P. and Sedat, J. W. "Fluorescence microscopy in three dimensions". Methods in Cell Biology 30: 353–377 (1989); Castleman, K. R. "Digital Image Processing". Prentice-Hall Inc. Englewood Cliffs, N.J. (1979). Correction of telescopic images by the use of suitably distorted mirrors and deconvolution of two dimensional telescope images having location dependent PSF are described in the following publications: Boden, A. F., Reeding, D. C, Hanisch, R. J., Mo, J. and White, R. "Comparative results with massively parallel spatially-variant maximum likelihood image restoration". Bul Am Astr. Soc 27:924–929 (1995); Boden, A. F., Reeding, D. C, Hanisch, R. J. and Mo, J. "Massively parallel spatially-variant maximum likelihood restoration of Hubble space telescope imagery". J Opt Soc Am A 13: 1537–1545 (1996); Jansson, P. A. ed. "Deconvolution of images and spectra". Academic Press NY (1997); Tyson R. K. "Principles of Adaptive Optics" Academic Press NY (1991). Reconstruction of blurred images from point objects is described in the following publications: Carrington, W. A., Lynch, R. M., Moore, D. W., Isenberg, G., Fogarty, K. E. and Fay, F. S. "Superresolution three-dimensional images of fluorescence in cells with minimal light exposure". Science 268:1483–1487 (1995); Femino, A. M., Fay, F. S., Fogarty, K., and Singer, R. H. "Visualization of single RNA transcripts in situ". Science 280:585–590 (1998).

SUMMARY OF THE INVENTION

The present invention seeks to provide improved apparatus and techniques for post acquisition image processing.

There is thus provided in accordance with a preferred embodiment of the present invention apparatus for computational adaptive imaging including an image information acquirer providing information relating to the refractive characteristics in a three-dimensional imaged volume, a ray tracer, utilizing the information relating to the refractive characteristics to trace a multiplicity of rays from a multiplicity of locations in the three-dimensional imaged volume through the three-dimensional imaged volume, thereby providing a location dependent point spread function and a deconvolver, utilizing the location dependent point spread function, to provide an output image corrected for distortions due to variations in the refractive characteristics in the three-dimensional imaged volume.

Preferably, the image information acquirer acquires at least two three-dimensional images of a three-dimensional imaged volume, at least one of the two three-dimensional images containing the information relating to the refractive characteristics in a three-dimensional imaged volume.

When the refractive characteristics are extractable from the image to be corrected for distortions, or are known independently, only one three-dimensional image need be acquired.

The acquirer may obtain refractive index information from DIC, for example from phase microscopy or from flourescence -for example in DNA associated stains wherein the stain intensity is proportional to the refractive index increment.

Refractive index mapping may be applied to samples whose refractive index is known. For example this may apply to microchip wafer structures, whose geometry is known.

In accordance with a preferred embodiment of the present invention, the image acquirer acquires at least three three-dimensional images of the three-dimensional imaged volume.

Preferably, the image acquirer acquires a plurality of three-dimensional images of the three-dimensional imaged volume, each the image having a discrete wavelength band.

Alternatively, the image acquirer acquires a multiplicity of three-dimensional images of the three-dimensional imaged volume, each the image having a wavelength band which is part of a continuum represented by the wavelength bands of the multiplicity of three-dimensional images.

In accordance with a preferred embodiment of the present invention, the ray tracer and the deconvolver utilize the information relating to the refractive characteristics in a three-dimensional imaged volume obtained from one of the three-dimensional images to correct at least another one of the three-dimensional image or itself The acquirer may obtain refractive index information from DIC, or from phase microscopy or from flourescence for example in DNA associated stains wherein the stain intensity is proportional to the refractive index increment.

Refractive index mapping may be applied to samples whose refractive index is known. For example this may apply to microchip wafer structures, whose geometry is known.

According to one embodiment of the present invention, the three-dimensional images are electromagnetic energy images. Preferably, the three-dimensional images are infrared images.

Alternatively, the three-dimensional images are non-electromagnetic images.

In accordance with a preferred embodiment of the present invention, the image acquirer receives digital image data from a digital image source and derives therefrom the information relating to the refractive characteristics in a three-dimensional imaged volume.

Preferably, the ray tracer and the deconvolver operate repeatedly over time to provide a multiplicity of output images, each corrected for distortions due to variations in the refractive characteristics in the three-dimensional imaged volume. Such a deconvolution process can be iteratively applied to the whole process to improve the estimation of the refractive index.

In accordance with one embodiment of the present invention, the output image is an acoustic image and the refractive characteristics are characteristics of a material which the passage of acoustic energy therethrough.

In accordance with an alternative embodiment of the present invention, the output image is an electromagnetic image and the refractive characteristics are characteristics of a material which the passage of electromagnetic energy therethrough.

There is also provided in accordance with a preferred embodiment of the present invention a method for computational adaptive imaging including the steps of:

providing information relating to the refractive characteristics in a three-dimensional imaged volume;

ray tracing, utilizing the information relating to the refractive characteristics, a multiplicity of rays from a multiplicity of locations in the three-dimensional imaged volume through the three-dimensional imaged volume, thereby providing a location dependent point spread function; and deconvoluting, utilizing the location dependent point spread function, thereby providing an output image corrected for distortions due to variations in the refractive characteristics in the three-dimensional imaged volume. Such a deconvolution process can be iteratively applied to the whole process to improve the estimation of the refractive index.

Preferably, the step of providing information includes acquiring at least two three-dimensional images of a three-dimensional imaged volume, at least one of the two three-dimensional images containing the information relating to the refractive characteristics in a three-dimensional imaged volume. When the refractive characteristics are extractable from the image to be corrected for distortions, or are known independently, only one three-dimensional image need be acquired.

In accordance with a preferred embodiment of the present invention, the step of providing information includes acquiring at least three three-dimensional images of a three-dimensional imaged volume.

Preferably, the step of providing information includes acquiring a plurality of three-dimensional images of the three-dimensional imaged volume, each image having a discrete wavelength band.

In accordance with a preferred embodiment of the present invention, the step of providing information includes acquiring a multiplicity of three-dimensional images of the three-dimensional imaged volume, each the image having a wavelength band which is part of a continuum represented by the wavelength bands of the multiplicity of three-dimensional images.

In accordance with one embodiment of the present invention, the three-dimensional images are electromagnetic energy images. Preferably, the three-dimensional images are infrared images.

In accordance with an alternative embodiment of the present invention, the three-dimensional images are non-electromagnetic images.

The refractive index may be in any medium and the imaging method may be for a generalised method for inhomogeneous media that may distort the image.

Preferably, the step of providing includes receiving digital image data from a digital image source and deriving therefrom the information relating to the refractive characteristics along a multiplicity of light paths in a three-dimensional imaged volume.

In accordance with a preferred embodiment of the present invention, the steps of providing information, ray tracing and deconvoluting operate repeatedly over time to provide a multiplicity of output images, each corrected for distortions due to variations in the refractive characteristics in the three-dimensional imaged volume. Such a deconvolution process may be iteratively applied to the whole process to improve the estimation for the refractive index map.

There is also provided in accordance with a preferred embodiment of the present invention apparatus for utilizing differential interference contrast images to provide three-dimensional refractive index information including a line integrator operating on differential interference contrast images displaying a directional derivative of refractive index of an object to invert the directional derivative thereof, thereby providing a plurality of two-dimensional representations of the refractive index of the object. Alternatively the three-dimensional refractive index map can be obtained from phase microscopy, or from fluorescence where the staining is proportional to the refractive index increment.

There is additionally provided in accordance with a preferred embodiment of the present invention apparatus for utilizing differential interference contrast images to provide three-dimensional refractive index information and also including a deconvolver performing deconvolution of the plurality of two-dimensional representations of the refractive index of the object, thereby reducing out-of-focus contributions to the two-dimensional representations of the refractive index of the object.

There is further provided in accordance with a preferred embodiment of the present invention a method for utilizing differential interference contrast images to provide three-dimensional refractive index information including performing line integration on differential interference contrast images displaying a directional derivative of refractive index of an object to invert the directional derivative thereof, thereby providing a plurality of two-dimensional representations of the refractive index of the object. Alternatively the three-dimensional refractive index map can be obtained from phase microscopy, or from flourexcence where the staining is proportional to the refractive index increment.

Additionally in accordance with a preferred embodiment of the present invention there is provided a method for utilizing differential interference contrast images to provide three-dimensional refractive index information and also including performing deconvolution of the plurality of two-dimensional representations of the refractive index of the object, thereby reducing out-of-focus contributions to the two-dimensional representations of the refractive index of the object. Again, the three-dimensional refractive index map can be obtained from phase microscopy, or from flourexcence where the staining is proportional to the refractive index increment.

Further in accordance with a preferred embodiment of the present invention there is provided apparatus for ray tracing through a medium having multiple variations in refractive index including:

a computer employing an analytically determined path of a ray through the multiplicity of locations in the medium, for a plurality of rays impinging thereon in different directions, by utilizing known local variation of the refractive index at a multiplicity of locations in the medium.

There is additionally provided in accordance with a preferred embodiment of the present invention a method of ray tracing through a medium having multiple variations in refractive index including:

determining local variation of the refractive index at a multiplicity of locations in the medium;

analytically determining the path of a ray through the multiplicity of locations in the medium, for a plurality of rays impinging thereon in different directions. The ray tracing may also include the computation of absorptions, reflections and scattering of rays and their contributions to the imaging process.

Still further in accordance with a preferred embodiment of the present invention there is provided apparatus for confocal microscopy including:

a ray tracer, employing known variations of the refractive index in a three-dimensional sample for determining the paths of a multiplicity of rays emerging from at least one point in the sample and passing through the sample, thereby determining an aberrated wavefront for each the point; and an adaptive optics controller utilizing the aberrated wavefront to control an adaptive optical element in a confocal microscope, thereby to correct aberrations resulting from the variations in the refractive index.

There is additionally provided in accordance with a preferred embodiment of the present invention a method for confocal microscopy including:

determining variations of the refractive index in a three-dimensional sample;

determining the paths of a multiplicity of rays emerging from at least one point in the sample and passing through the sample, thereby determining an aberrated wavefront for each the point; and utilizing the aberrated wavefront to control an adaptive optical element in a confocal microscope, thereby to correct aberrationresulting from the variations in the refractive index.

There is additionally provided in accordance with a preferred embodiment of the present invention a method for adding (computationally or physically) in the imaging path a three-dimensional medium (anti-sample) with refractive properties that correct for the distortions of the three-dimensional sample.

BRIEF DESCRIPTION OF THE DRAWINGS

The present invention will be understood and appreciated more fully from the following detailed description, taken in conjunction with the drawings in which:

FIGS. 1A and 1B are respectively representations of three dimensional microscopic images of an object according to the prior art and in accordance with the present invention;

BRIEF DESCRIPTION OF APPENDICES

Microfiche appendix A is a hexadecimal listing of a program which converts DIC images to a three dimensional map of refraction indices of a corresponding imaged object by line integration;

Microfiche appendix B is a hexadecimal listing of a program which calculates location dependent PSF by ray tracing through the imaged object, taking into account the three dimensional map of refraction indices thereof, calculating a distorted wavefront and computing therefrom a diffraction integral, thereby to provide the PSF;

Microfiche appendix C is a hexadecimal listing of a program which deconvolutes the location dependent PSF from a distorted image, thus providing a corrected image of the imaged object.

DETAILED DESCRIPTION OF THE INVENTION

Figure 1A:
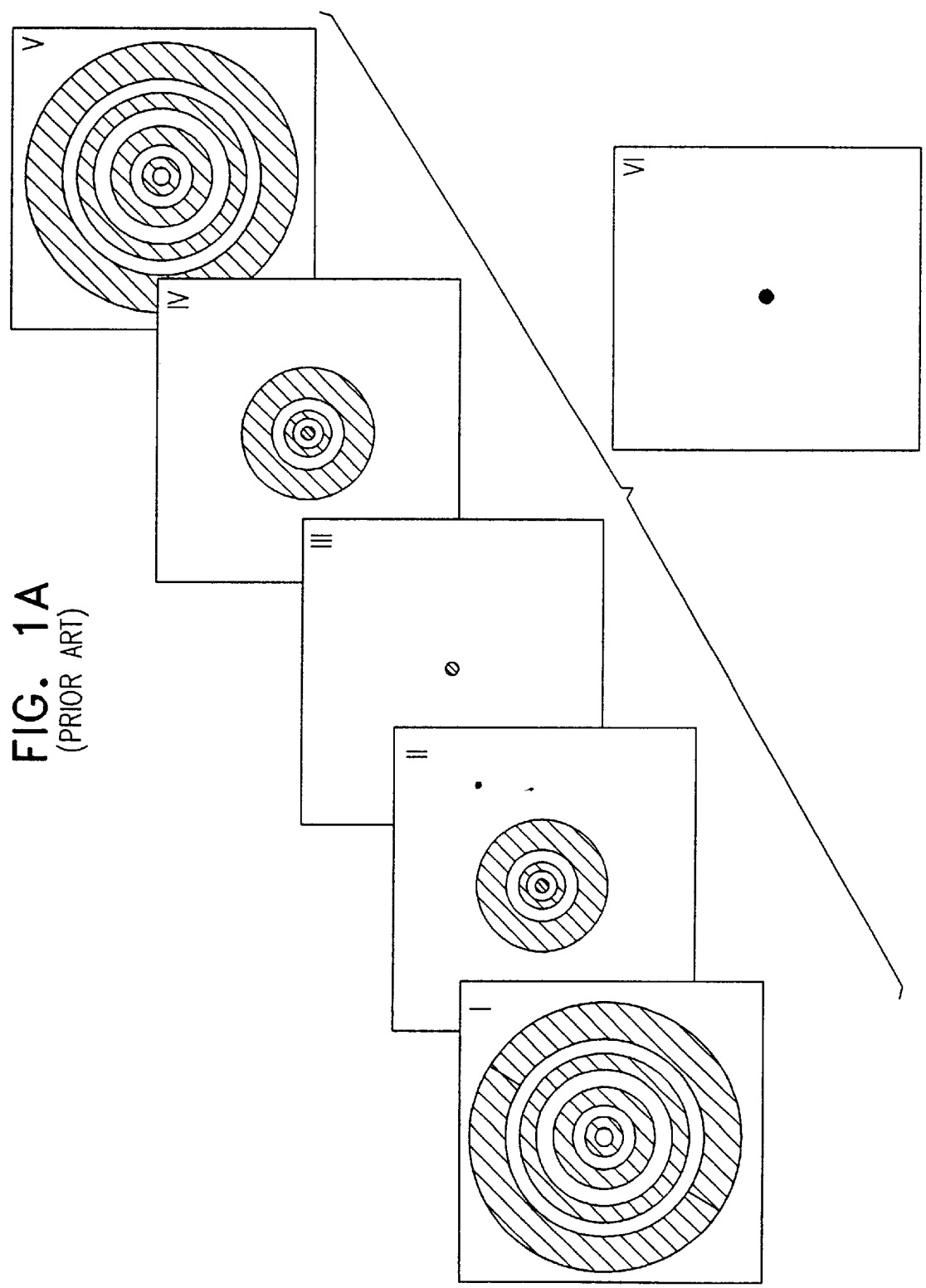

Reference is now made to FIGS. 1A and 1B, which are respectively representations of three dimensional microscopic images of an object according to the prior art and in accordance with the present invention.

It is known in the prior art to image a point source or a collection of point sources in an ideal sample displaying no substantial variation in refractive index. When an ideal optical system is focussed at slightly different depths in the sample, a three dimensional image appears, including a plurality of two-dimensional diffraction limited images designated by Roman numerals I, II, III, IV and V in FIG. 1A. The prior art, described, inter alia in the aforesaid Agard et al 1989 reference is capable of deconvoluting the plurality of two-dimensional images I–V to a deconvoluted three dimensional image, including a single in focus two-dimensional image VI, which contains substantially all of the image intensity from images I–V and a plurality of out of focus two-dimensional images which substantially contain no image intensity.

The prior art, however, does not know how to deal adequately with samples which display substantial variation in refractive index.

The present invention provides a solution to this problem, as illustrated in FIG. 1B which shows images of a non-ideal sample, such as a biological sample, displaying substantial variation in refractive index. When an ideal optical system is focussed at slightly different depths in the non-ideal sample, a three-dimensional image appears, including a plurality of two-dimensional diffraction limited images designated by Roman numerals I, II, III, IV and V in FIG. 1B. In contrast to the images appearing in FIG. 1A, it is seen that these images are extremely non-uniformly distorted due to variations in the refractive index at various locations in the sample.

The present invention, as will be described hereinbelow, is capable of deconvoluting the plurality of two-dimensional images I–V in FIG. 1B, notwithstanding their great distortions due to variations in the refractive index at various locations in the sample, to a substantially non-distorted, deconvoluted three-dimensional image, including a single in-focus two-dimensional image VI, which contains substantially all of the image intensity from images I–V and a plurality of out-of- focus two-dimensional images which substantially contain no image intensity.

Figure 2:
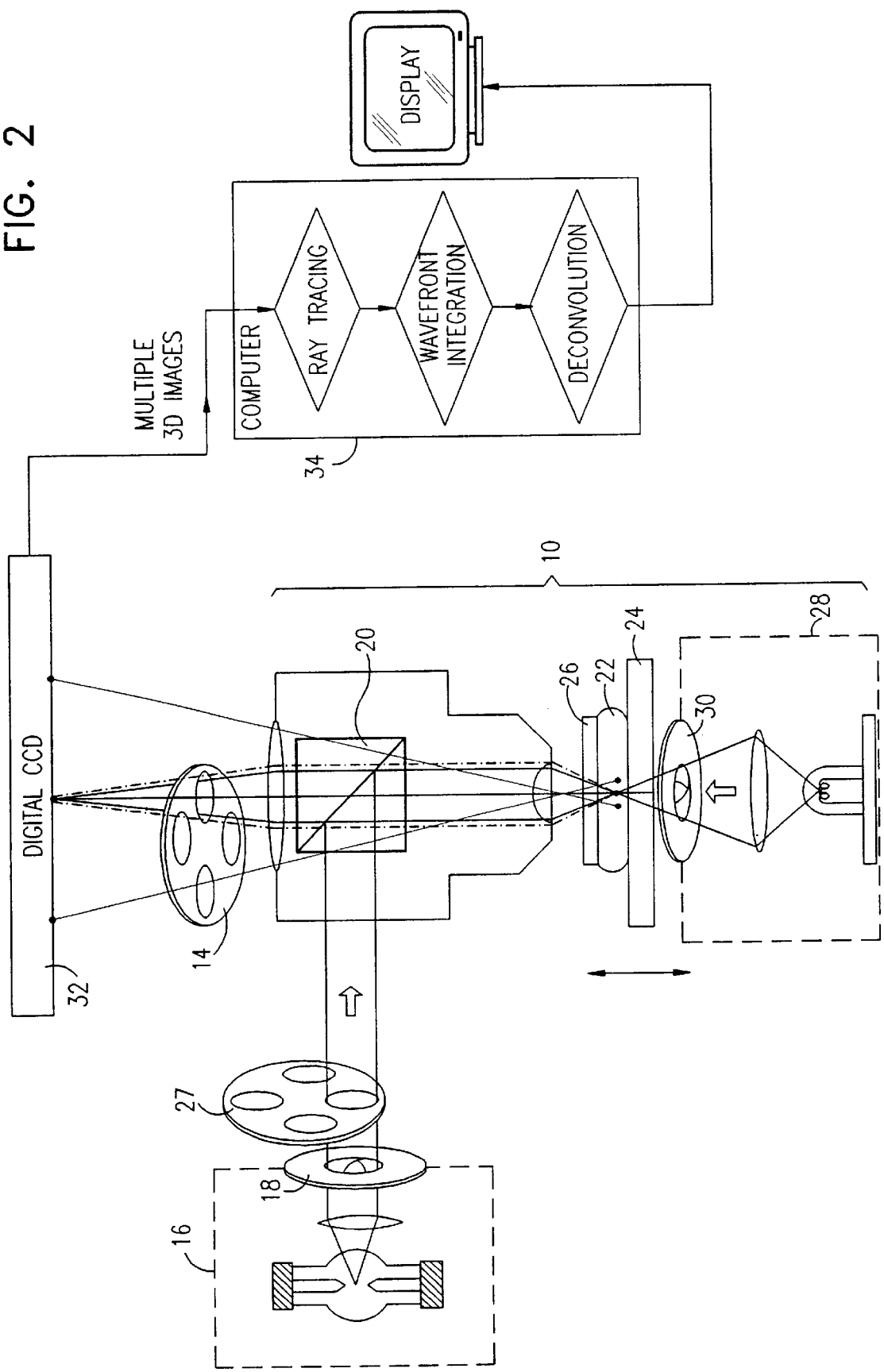
FIG. 2 is a simplified partially pictorial, partially block diagram illustration of apparatus for computational adaptive imaging constructed and operative in accordance with a preferred embodiment of the present invention.

Reference is now made to FIG. 2, which is a simplified partially pictorial, partially block diagram illustration of apparatus for computational adaptive imaging constructed and operative in accordance with a preferred embodiment of the present invention. The apparatus of FIG. 2 typically includes a conventional computer-controlled optical microscope 10, such as a microscope manufactured by Carl Zeiss and sold under the name Axioskop. Associated with microscope 10 there are preferably provided computer controlled filter wheels 12 and 14. Filter wheel 12 is disposed downstream of an excitation light source 16, such as a mercury arc lamp, which provides epi-illumination via a computer-controlled shutter 18 and filter wheel 12 to a dichroic mirror 20 within the microscope 10.

Trans-illumination is provided to a sample 22, typically mounted between two slides 24 and 26, by means of a halogen light source 28 via a computer-controlled shutter 30. Depending on which of shutters 18 and 30 is open, the sample receives trans-illumination or epi-illumination so as to provide either a DIC image or a fluorescent image respectively. It is noted that DIC images conventionally require additional optical elements in the imaging light path, which are omitted from FIG. 2 for the sake of conciseness and clarity.

In accordance with a preferred embodiment of the present invention, the DIC or fluorescent image is received via computer-controlled filter wheel 14 by a digital CCD sensor 32, such as a Photometrics PXL. Preferably a polarizer is included in one of the windows of filter wheel 14 and is employed for DIC imaging.

In accordance with a preferred embodiment of the present invention, the output of the digital CCD sensor 32 is supplied to a computer 34, such as a Silicon Graphics 02 workstation which performs the following functionality:

ray tracing, utilizing information relating to the refractive characteristics in the sample, a multiplicity of rays from a multiplicity of locations in the sample through the sample, thereby providing a location dependent point spread function; and deconvoluting, utilizing the location dependent point spread function, thereby providing an output image corrected for distortions due to variations in the refractive characteristics in the three-dimensional imaged volume.

Preferably wavefront integration is performed following the ray tracing and prior to the deconvoluting.

In accordance with a preferred embodiment of the present invention, the information relating to the refractive characteristics of the sample is provided by line integration of the DIC image.

Figure 3:
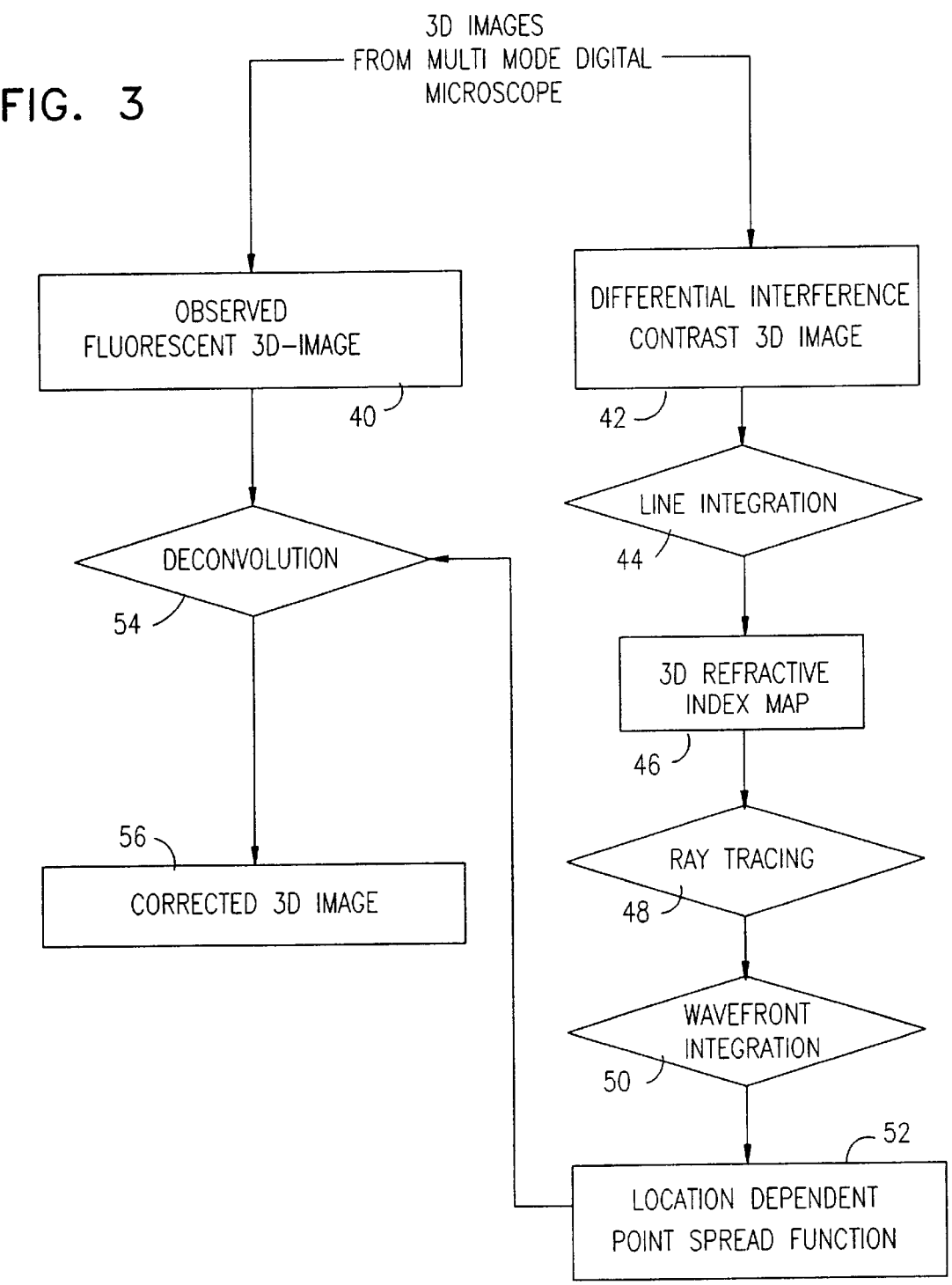
FIG. 3 is a simplified flow chart of the operation of the apparatus for computational adaptive imaging of FIG. 2.

Reference is made to FIG. 3, which is a simplified flow chart of the operation of the apparatus for computational adaptive imaging of FIG. 2. As illustrated in FIG. 3, three dimensional images from the microscope 10 and CCD 32, typically include a plurality of observed fluorescent 3D images 40 and a differential interference contrast (DIC) 3D image 42.

In accordance with a preferred embodiment of the present invention, line integration 44 is performed on the DIC image, preferably using the software exemplified in Appendix A. The line integration preferably provides a 3D refractive index map 46.

In accordance with a preferred embodiment of the present invention, ray tracing 48 is performed on the 3D refractive index map 46 and the resulting wavefront is subject to wavefront integration 50, thus providing a location dependent point spread function (PSF) 52. Preferably the ray tracing 48 and the wavefront integration 50 is performed by using the software exemplified in Appendix B.

In accordance with a preferred embodiment of the present invention, the location dependent PSF is utilized in a deconvolution step 54 which is applied to the observed fluorescent 3D image 40. Preferably the deconvolution 54 is performed by using the software exemplified in Appendix C.

In accordance a preferred embodiment of the invention, the deconvolution produces a corrected image, such as the image illustrated at reference VI in FIG. 1B.

Figure 4:
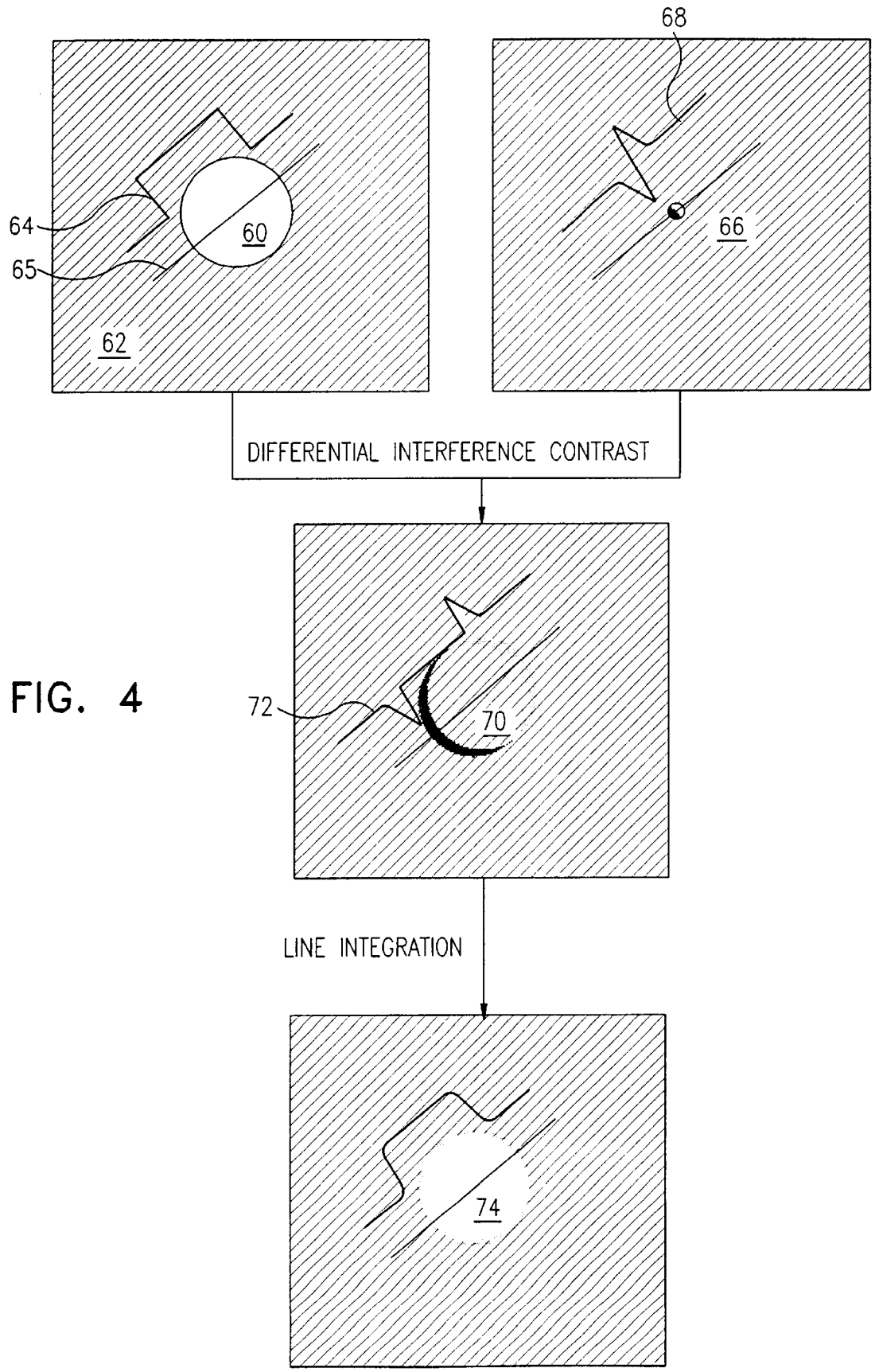
FIG. 4 is a simplified diagram of line integration functionality which is carried out by the apparatus of FIG. 2.

Reference is now made to FIG. 4, which is a simplified diagram of line integration functionality which is carried out by the apparatus of FIG. 2, preferably utilizing the software exemplified in Appendix A. FIG. 4 illustrates a sample, such as a sphere 60 of uniform index of refraction, which differs from that of surrounding media 62. Sample 60 may be taken to represent a nucleus, while the surrounding media may be taken to represent cytoplasm. A scan line 64 illustrates the index of refraction as a function of location along line 65. The characteristic PSF of the microscope 10 operating in the DIC imaging mode is illustrated at reference numeral 66. The PSF is also illustrated by trace 68.

The output image of sample 60 of the CCD sensor 32 operating in a DIC mode is illustrated at reference numeral 70 and also by trace 72. Line integration of the output image, preferably utilizing the software exemplified in Appendix A, produces an image 74 which accurately represents the original sample, seen at reference numerals 60 and 62.

It is appreciated that line integration of DIC images has two complex contributions in reality. One is the accumulation of noise in the integration and the second is the slow contribution of low-intensity out-of-focus contributions. The problem of noise is preferably alleviated by introducing a decay function in the line integration. This decay feature appears in Appendix A. The out-of-focus contribution can be reduced significantly by deconvoluting the integrated DIC images. This feature also appears in Appendix A.

Figure 5:
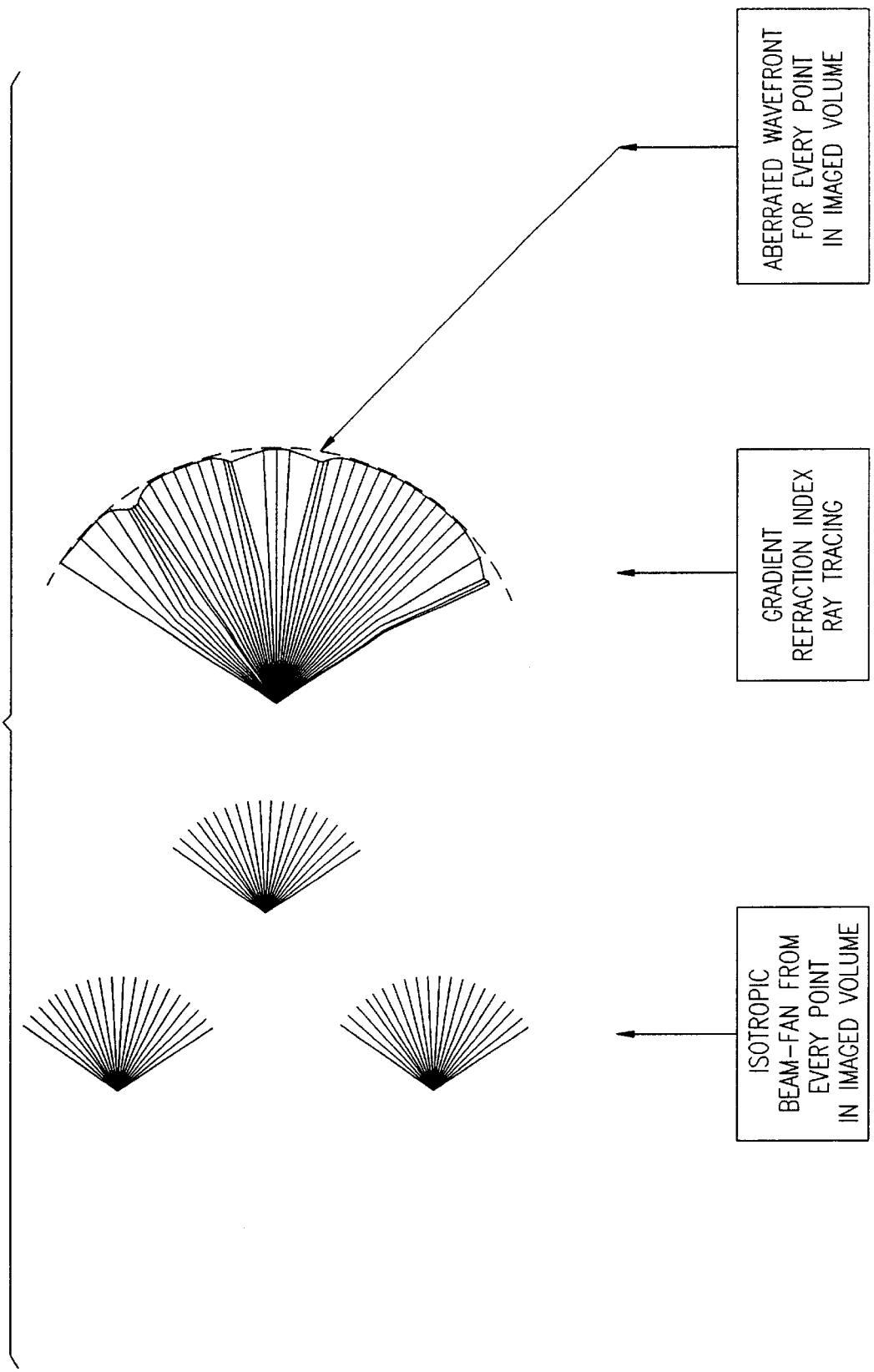
FIG. 5 is a simplified diagram of ray tracing functionality which is carried out by the apparatus of FIG. 2.

Reference is now made to FIG. 5, which is a simplified diagram of ray tracing functionality which is carried out by the apparatus of FIG. 2. As seen in FIG. 5, it is seen that an isotropic fan of rays is drawn from every point in an imaged volume, e.g. the sample. These rays are ray traced, preferably using the software embodied in Appendix B, such that their paths and phases are modified in accordance with variations in the refractive index of the sample. The result of the ray tracing is an aberrated wavefront for every point in the imaged volume.

Figure 6:
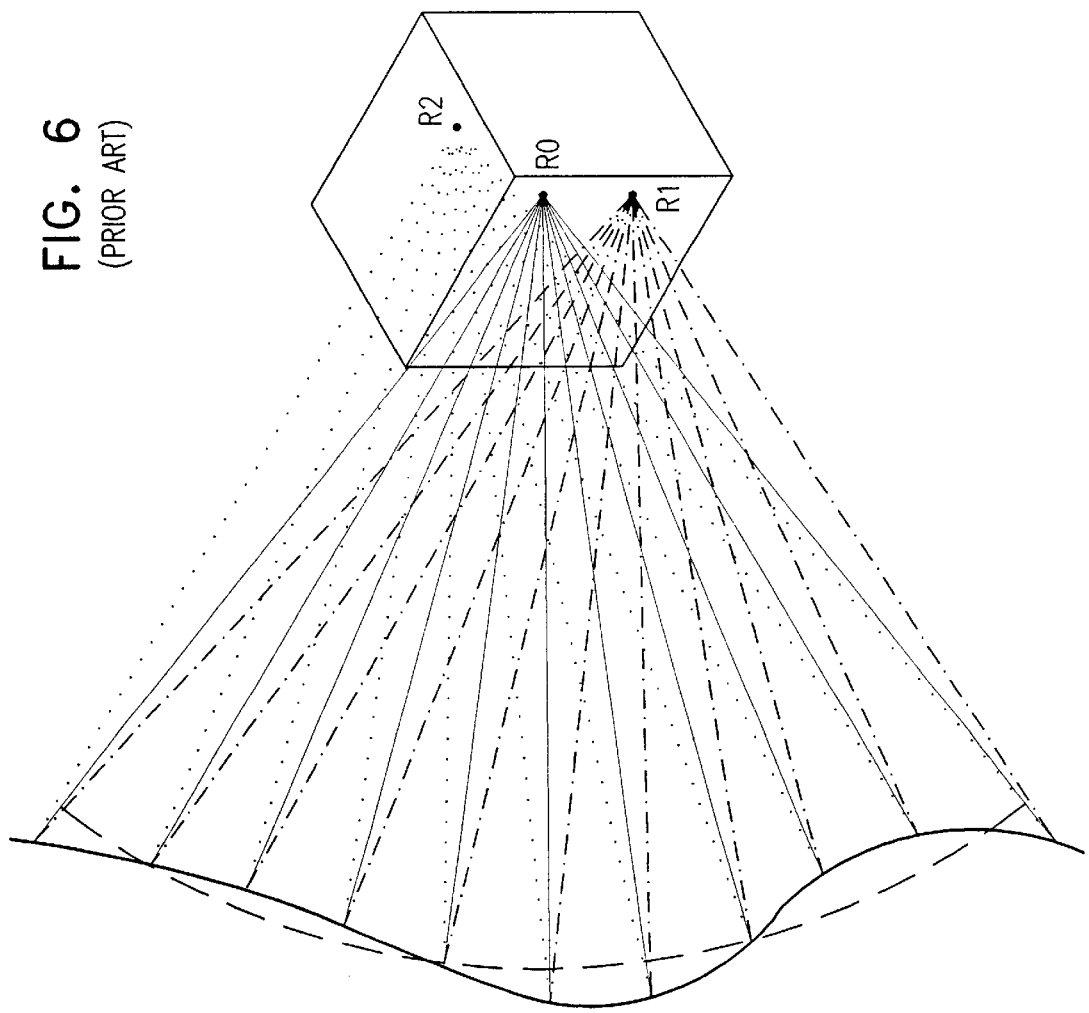
FIG. 6 is a simplified diagram of wavefront integration functionality which is carried out by the apparatus of FIG. 2.

Reference is now made to FIG. 6, which is a simplified diagram of prior art wavefront integration functionality which is carried out by the apparatus of FIG. 2 preferably using the software embodied in Appendix B. As seen in FIG. 6, for every point in the vicinity of a focus R0, an interference integral is taken over the wavefront. The integrations for all of the points in the vicinity of the focus R0 define the three-dimensional point spread function, as described inter alia in the aforesaid prior art reference to Goodman.

Figure 7:
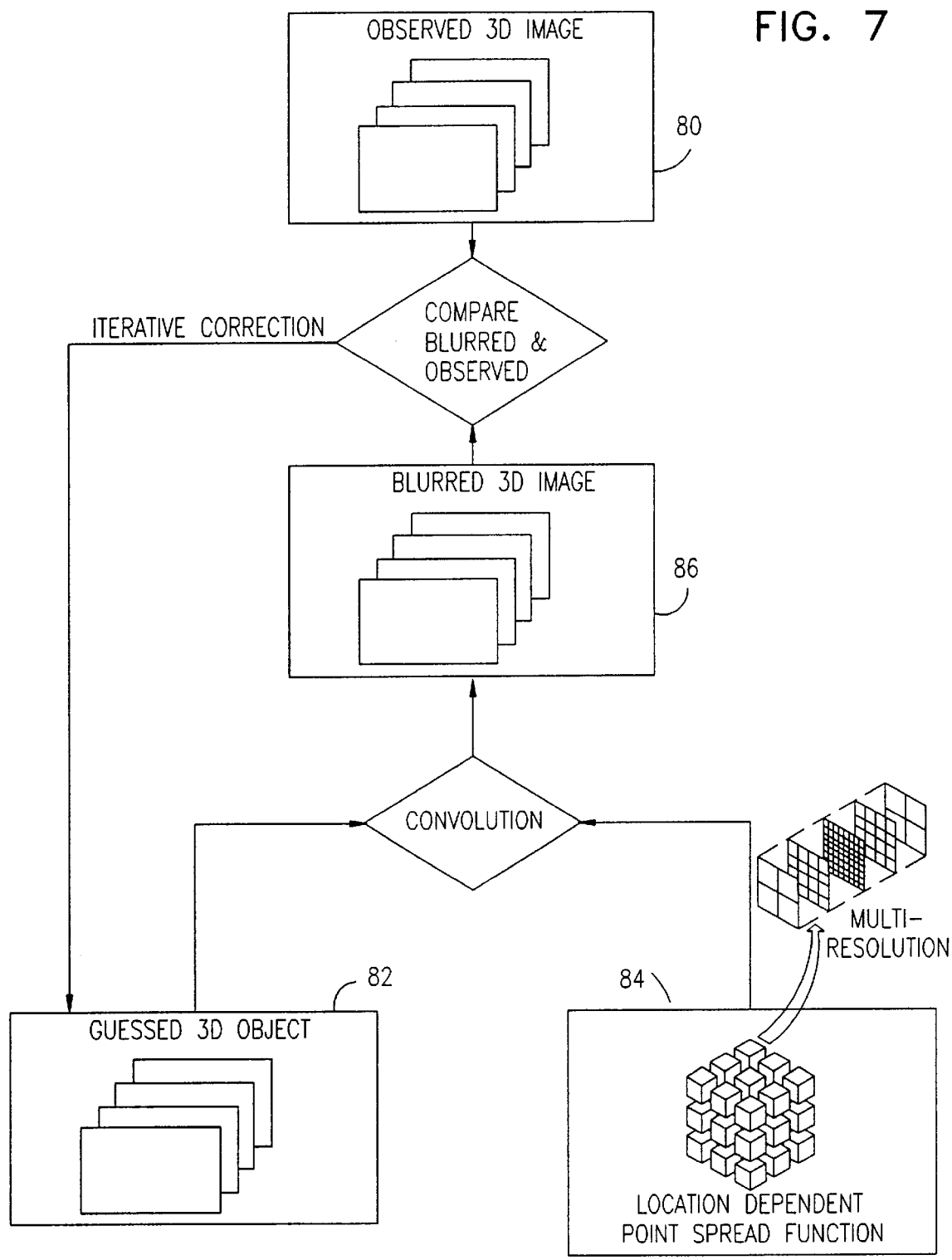
FIG. 7 is a simplified flow chart illustrating deconvolution functionality which is carried out by the apparatus of FIG. 2.

Reference is now made to FIG. 7, which is a simplified flow chart illustrating deconvolution functionality which is carried out by the apparatus of FIG. 2, preferably utilizing the software embodied in Appendix C. As seen in FIG. 7, the observed image 80, such as the observed fluorescent 3D image 40 (FIG. 3) is deconvoluted using the point spread function (PSF) calculated as described hereinabove with reference to FIGS. 5 and 6. It is appreciated that the location dependent PSF is preferably a multi-resolution PSF. This feature appears in the software of Appendix C. This calculation is preferably performed in an iterative process which endeavors to provide progressively better approximations of the imaged sample.

This iterative process typically proceeds by initially defining a guessed object 82, which typically is identical to the observed image. The guessed object is convoluted with a location dependent point spread function 84, such as that derived by ray tracing and wavefront integration (FIG. 3) to produce a blurred image 86. This blurred image is compared with the observed image and a correction based on the comparison is iteratively applied to the guessed object. Following multiple iterations, the guessed object constitutes the corrected 3D image of the sample in accordance with a preferred embodiment of the present invention.

A preferred method for constructing a system operative in accordance with a preferred embodiment of the present invention is now described with reference to Appendices A, B, and C:

a) Provide a SILICON GRAPHICS workstation, such as model O2, with 128 megabytes of RAM memory running the IRIX Release 6.3 IP32 operating system;

b) Install the DELTAVISION optical sectioning microscope system, commercially available from Applied Precision Inc., 1024 12th Ave NW, Issaquah Wash. 98027-8929, USA;

c) Create three binary files from the hexadecimal listings of Appendices A, B and C;

d) Uncompress the three binary files using GZIP version 1.1.2 into three executable files named "pardic," "dictrace," and "decon_full";

e) Provide at least one 3D DIC image and one 3D fluorescent image using the DELTAVISION system;

f) Run the pardic executable file to perform the following:
Read one optical section from the 3D DIC image;
Use the 'F' submenu to filter the image from slowly varying backgrounds;
Use the line integration submenu 'U' to convert the 3D DIC image to a 3D refractive index map;
For 'filling up' the effect of decay in the line integration use DIC-deconvolution submenu 'W'. To do this, first define the DIC point spread function using the kernel submenu 'K';
For an improved index map, read three consecutive optical DIC sections and use the 'Z' submenu to subtract out-of-focus contributions using nearest neighbor approximation of the three-dimensional deconvolution;
Output the refractive index 3D map section by section;

g) Run the dictrace executable file to perform the following:
Read in the refractive index 3D map. Simulated maps including different gradient functions are available as alternative inputs;
Create a fan of rays originating from a point and homogeneously spanning a cone with a defined solid angle. The opening angle and angular increment can be defined. Typically 200,000 rays are launched into a solid angle cone of 60 degrees;
Trace the rays through the refractive index 3D mapped volume, and calculate the position of intersection and the phase of each of the rays at the entrance pupil wavefront sphere;
Transform the converging wavefront in the entrance pupil of the optical system to a diverging wavefront at the exit pupil, and calculate the 3D point spread function corresponding to this wavefront using the Kirchhoff interference integral submenu;
Output the 3D point spread function for the calculated location of the source point of the fan of rays;

h) Run the decon_full executable file to perform the following:
Input the location-dependent 3D point spread function and the fluorescent image for deconvoluting, and run the iterative deconvolution. The program outputs the deconvoluted improved 3D image.

Additional technical descriptions of a preferred embodiment of the invention appear in the following article by the inventor Z. Kam: "Microscopic Differential Interference Contrast Image Processing by Line Integration (LID) and Deconvolution". Bioimaging 6 (4): 166–176 (1998), and which is incorporated herewith.

It will be appreciated by persons skilled in the art that the present invention is not limited to what has been particularly shown and described hereinabove. Rather the scope of the present invention includes both combinations and subcombinations of the various features described hereinabove as well as modifications and additions thereto which would occur to a person of skill in the art upon reading the foregoing description and which are not in the prior art.

We claim:

1. Apparatus for three-dimensional image processing, comprising:
   an imaging system reading a three dimensional map of variations in the refractive characteristics in a volume;
   a ray tracer, utilizing said three dimensional map to analytically trace a multiplicity of rays from a multiplicity of locations in said volume through said volume, thereby providing a location dependent point spread function; and
   a three dimensional deconvolver, utilizing the location dependent point spread function, to provide an output image corrected for distortions due to three dimensional variations in the refractive characteristics in said volume.

2. Apparatus according to claim 1 wherein the imaging system is adapted to obtain refractive index information from DIC, or from phase microscopy or from fluorescence.

3. Apparatus according to claim 1 wherein the imaging system is adapted to utilise previously determined refractive characteristics.

4. Apparatus according to claim 1 and wherein the three dimensional map comprises at least two three-dimensional images of said volume, at least one of the two three-dimensional images containing information relating to the refractive characteristics in said volume.

5. Apparatus according to claim 4 and wherein the three dimensional map comprises at least three three-dimensional images of said volume.

6. Apparatus according to claim 4 and wherein the three dimensional map comprises a plurality of three-dimensional images of said volume, each of the images having a discrete wavelength band.

7. Apparatus according to claim 4 and wherein the three dimensional map comprises a multiplicity of three-dimensional images of said volume, each -of the images having a wavelength band which is part of a continuum represented by the wavelength bands of the multiplicity of three-dimensional images.

8. Apparatus according to claim 4 wherein the three dimensional map comprises a single three-dimensional image of said volume.

9. Apparatus according to claim 4 and wherein at least one of the ray tracer and the deconvolver utilize the three dimensional map of variations in the refractive characteristics in said volume obtained from one of the three-dimensional images to correct at least another one of the three-dimensional images.

10. Apparatus according to claim 9 wherein the ray tracer includes effects on the image of at least one of absorptions, reflections and scattering in the sample.

11. Apparatus according to claim 1, and wherein the imaging system provides electromagnetic energy images.

12. Apparatus according to claim 11 and wherein the electromagnetic energy is infrared energy.

13. Apparatus according to claim 1, and wherein the imaging system provides non-electromagnetic energy images.

14. Apparatus according to claim 1, and wherein the imaging system receives digital image data from a digital image source and derives therefrom said three-dimensional map of variations in the refractive characteristics in said volume.

15. Apparatus according to claim 1, and wherein the imaging system, the ray tracer and the deconvolver operate repeatedly over time to provide a multiplicity of output images, each corrected for distortions due to three-dimensional variations in the refractive characteristics in said volume.

16. Apparatus according to claim 1, and wherein the output image is an acoustic image and the refractive characteristics are characteristics of a material which influence the passage of acoustic energy therethrough.

17. Apparatus according to claim 1, and wherein the output image is an electromagnetic image and the refractive characteristics are characteristics of a material which influence the passage of electromagnetic energy therethrough.

18. A method for three-dimensional image processing comprising the steps of:
   providing an imaging system;
   utilizing said imaging system for reading a three dimensional map of variations in the refractive characteristics in a volume;
   analytically ray tracing, utilizing said three dimensional map, a multiplicity of rays from a multiplicity of locations in said volume through said volume, thereby providing a location dependent point spread function; and
   three-dimensionally deconvoluting, utilizing the location dependent point spread function, thereby providing an output image corrected for distortions due to three dimensional variations in the refractive characteristics in said volume.

19. A method according to claim 18, and also comprising the step of adding in an imaging path a three-dimensional medium with refractive properties that correct for the distortions of the three-dimensional sample.

20. A method according to claim 18 and wherein the step of reading a three dimensional map comprises acquiring at least two three-dimensional images of a said volume, at least one of the two three-dimensional images containing information relating to the refractive characteristics in said volume.

21. A method according to claim 20 and wherein the step of reading a three dimensional map comprises acquiring at least three three-dimensional images of said volume.

22. A method according to claim 20 and wherein the step of reading a three dimensional map comprises acquiring a plurality of three-dimensional images of said volume, each the images having a discrete wavelength band.

23. A method according to claim 20 and wherein the step of reading a three dimensional map comprises acquiring a multiplicity of three-dimensional images of said volume, each of the images having a wavelength band which is part of a continuum represented by the wavelength bands of the multiplicity of three-dimensional images.

24. A method according to claim 18, and wherein said imaging system provides electromagnetic energy images.

25. A method according to claim 24 and wherein the electromagnetic images are infrared images.

26. A method according to claim 18, and wherein said imaging system provides non-electromagnetic images.

27. A method according to claim 18, and wherein the step of utilizing said imaging system comprises receiving digital image data from a digital image source and deriving therefrom a three dimensional map of variations in the refractive characteristics along a multiplicity of light paths in said volume.

28. A method according to claim 18, and wherein the steps of reading a three dimensional map, ray tracing and deconvoluting operate repeatedly over time to provide a multiplicity of output images, each corrected for distortions due to variations in the three-dimensional refractive characteristics in said volume.

29. A method according to claim 28 wherein the three-dimensional refractive characteristics are estimated.

30. Apparatus according to claim 1, and wherein said image processing is computational adaptive three-dimensional image processing.

31. Apparatus according to claim 1, and wherein said three dimensional map of variations in the refractive characteristics is obtained from measurement of the gradient of said three-dimensional refractive characteristic of said volume at at least one point using DIC microscopy, and computational integration performed therefrom.

32. A method according to claim 18, and wherein said image processing is computational adaptive three-dimensional image processing.

33. A method according to claim 18, and wherein said step of utilizing said imaging system for reading a three dimensional map of variations in the refractive characteristics in a volume is performed by measurement of the gradient of said three-dimensional refractive characteristic of said volume at at least one point using DIC microscopy, and performing computational integration therefrom.

\* \* \* \* \*

UNITED STATES PATENT AND TRADEMARK OFFICE
CERTIFICATE OF CORRECTION

PATENT NO.    : 6,658,142 B1
DATED         : December 2, 2003
INVENTOR(S)   : Zvi Kam et al.

It is certified that error appears in the above-identified patent and that said Letters Patent is hereby corrected as shown below:

<u>Title page,</u>
Insert Item:
-- [30] Foreign Application Priority Data
December 1, 1998 (IL) ................... 127359 --

Signed and Sealed this

Twenty-ninth Day of June, 2004

JON W. DUDAS
*Acting Director of the United States Patent and Trademark Office*